Figure 1:
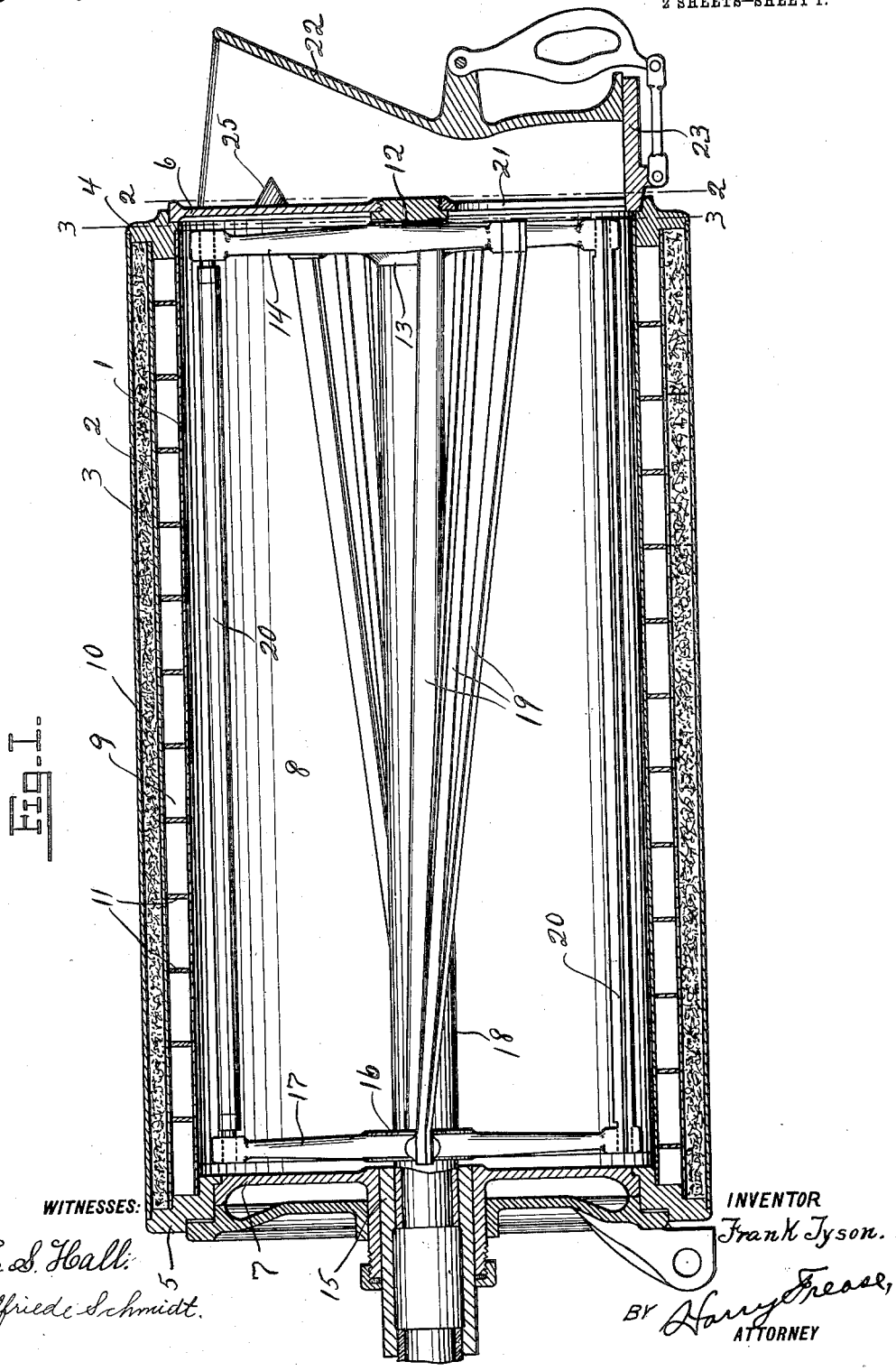

F. TYSON.
ICE CREAM FREEZER.
APPLICATION FILED MAY 19, 1913.

1,089,094.

Patented Mar. 3, 1914.
2 SHEETS—SHEET 1.

WITNESSES:
E. S. Hall.
Elfriede Schmidt.

INVENTOR
Frank Tyson.
BY Harry Frease,
ATTORNEY

F. TYSON.
ICE CREAM FREEZER.
APPLICATION FILED MAY 19, 1913.
1,089,094.
Patented Mar. 3, 1914.
2 SHEETS—SHEET 2.
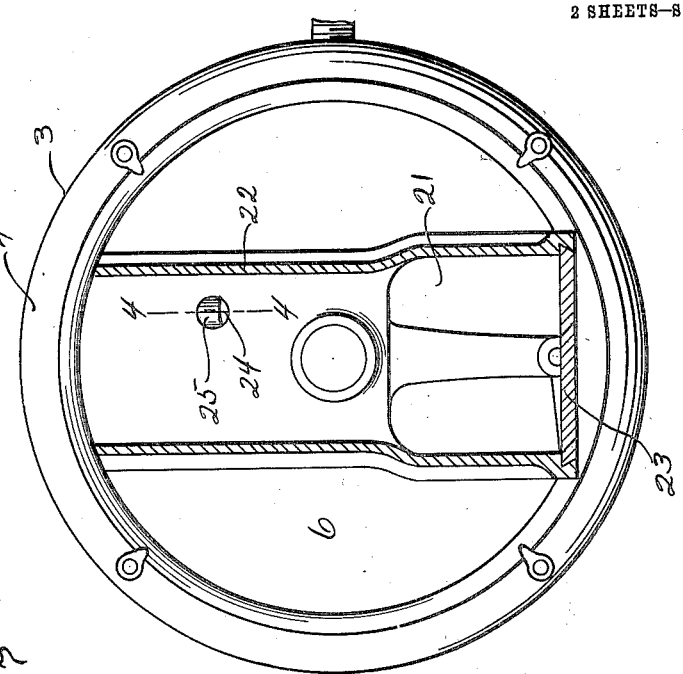
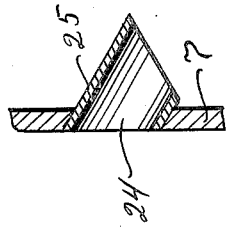
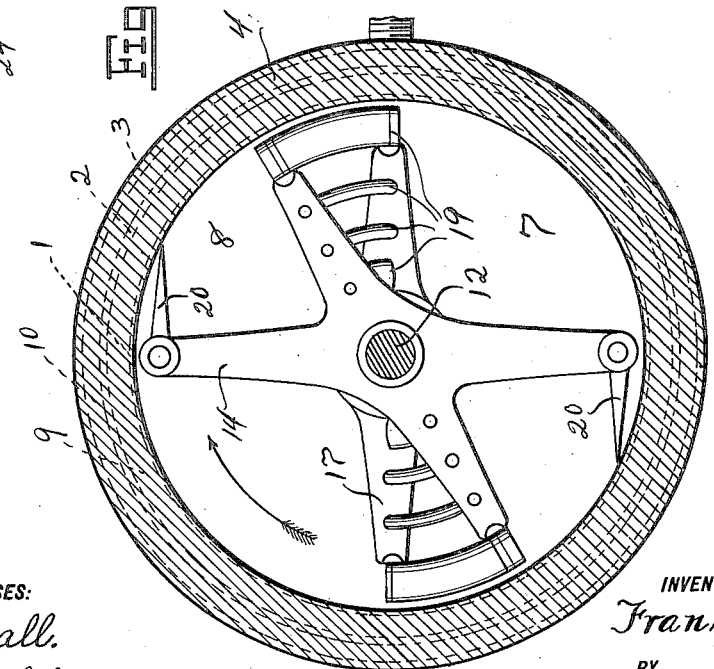
WITNESSES:
E S Hall.
Elfriede Schmidt.
INVENTOR
Frank Tyson.
BY
Harry Frease
ATTORNEY

UNITED STATES PATENT OFFICE.

FRANK TYSON, OF CANTON, OHIO, ASSIGNOR TO THE TYSON COMPANY, OF CANTON, OHIO, A CORPORATION OF OHIO.

ICE-CREAM FREEZER.

1,089,094.   Specification of Letters Patent.   Patented Mar. 3, 1914.

Application filed May 19, 1913. Serial No. 768,409.

*To all whom it may concern:*

Be it known that I, FRANK TYSON, a citizen of the United States, residing at Canton, in the county of Stark and State of Ohio, have invented certain new and useful Improvements in Ice-Cream Freezers, of which the following is a specification.

The invention relates to horizontal-cylinder ice-cream freezers, having rotating agitating, scraping and ejecting mechanism therein, and more particularly to an improvement in the cylinder head set forth in Letters Patent No. 1,001,906, dated August 29, 1911; and the object of the improvement is to provide a port in the upper portion of the head within the inlet and outlet hopper thereon so that a portion of the cream will be ejected and flow from the upper portion of the freezing chamber and will circulate downward within the hopper and into the freezing chamber through the opening in the lower portion of the head, thus exposing such stream of cream to the view of the operator looking into the hopper.

A preferred embodiment of the invention thus set forth in general terms, is illustrated in the accompanying drawings forming part hereof, in which:

Figure 1 is a longitudinal section of the freezing cylinder showing the agitating, scraping and ejecting mechanism in side elevation; Fig. 2, a cross section of the hopper on line 2—2, Fig. 1, showing the front head of the freezing cylinder; Fig. 3, a cross section of the freezing cylinder on line 3—3, Fig. 1, showing the front end of the agitating, scraping and ejecting mechanism; and Fig. 4, a fragmentary section on line 4—4, Fig. 2, showing the eduction port.

Similar numerals refer to similar parts throughout the drawings.

The horizontal cylinder is composed of the concentric tubes, 1, 2 and 3, the ends of which are secured to the front and rear head-rings 4 and 5, in which are mounted the front and rear heads 6 and 7, thus forming the freezing chamber 8 within the inner tube 1, the brine chamber 9 between the tubes 1 and 2, and the insulating chamber 10 between the tubes 2 and 3; it being understood that the spiral partition 11 is provided in the brine chamber to form a spiral duct thereof, and that the insulating chamber is filled with a suitable insulating material, all in a manner well known in the art.

The axial journal pin 12 is secured on the inner side of the front head 6 on which pin is journaled the hub 13 of the forward spider 14; and the axial journal bearing 15 is provided in the rear head 7 in which bearing is journaled the hub 16 of the rearward spider 17; which hubs are respectively secured in and on the ends of the tubular shaft 18, and the hub 16 of the rear spider is connected with suitable driving mechanism, not shown.

The spirally disposed agitating bars 19 and ejecting blades 20 extend between and are connected to corresponding arms of the front and rear spiders, and the longitudinally disposed scraping blades extend between and are pivotally connected to intervening arms of the spiders; these parts being arranged to operate in the usual manner, whereby the contents of the freezing chamber will be suitably agitated and scraped from the wall of the cylinder and ejected therefrom when the outlet valve is open.

The front head of the cylinder is provided with the opening 21 in its lower portion which serves as an inlet and also an outlet for the freezing chamber; and an external guard wall is also provided on the front head 6 forming the hopper 22 extending upward from the opening and downward in front of the opening and forming an outlet mouth below the opening, in which mouth is provided the outlet valve 23, all substantially as set forth in said Patent No. 1,001,906.

The eduction port 24 is provided in the upper portion of the front head, preferably between or within the walls of the hopper, which port may be and is preferably provided with the downwardly inclined tubular spout 25; the use of such spout not being an essential feature of the invention, but its use is preferred for more positively deflecting the cream which flows out of the port downward into the hopper, when the port is located at or near the upper end of the hopper.

The eduction port is preferably located at a substantial distance from that side of the median line of the cylinder head toward which the rotating mechanism operates on the upper side of its axial shaft, which location of the port prevents the operation of this mechanism from throwing the cream out of the port in an upward direction, and has been found to increase the amount of cream which is discharged through the eduction port by the rotating mechanism.

For operating the machine, brine or other suitable refrigerant is circulated through the refrigerating duct and the agitating, scraping and ejecting mechanism is rotated in the direction indicated by the arrow in Fig. 3. The outlet valve being closed, cream is supplied into the freezing chamber through the hopper and the opening in the lower portion of the front head; whereupon the rotating mechanism whips and beats the cream while it is being congealed by the refrigerant.

In practice, the freezing cylinder is filled with liquid cream so that the surface thereof rises to about the axis or middle thereof, and seeking a level, the cream also rises in the hopper to substantially the same height; excepting however, the ejecting action of the spirally disposed blades and bars, forces the cream in the hopper slightly above the normal level therein, and the suction action of the longitudinal blades alternately reduces the cream in the hopper slightly below its normal level therein; and the ebb and flow thus caused by the rotating mechanism, effects such a continuous circulation of the cream through the opening in the lower portion of the front head as to maintain a substantial uniformity of its condition in the freezing chamber and in the hopper.

The action of the rotating mechanism within the freezing chamber furthermore throws a portion of the cream outward through the eduction port, whence it flows or drops downward within the hopper and merging with the cream in the lower portion thereof returns by circulating therewith into the freezing chamber; and it is evident that the small stream of cream thus flowing from the eduction port is plainly visible to the eye of the operator looking downward into the hopper, and its condition and texture can thus be inspected at all times during the freezing operation.

In freezing a batch of ice cream, it is customary to continue the whipping and beating of the cream with the rotating mechanism and the concurrent congealing thereof by the refrigerant, until the cream has been brought to a proper degree of thickness for ejecting it from the machine, depending upon the disposition to be made thereof. For instance, when the cream is to be stored or packed in a refrigerated can for future use, it may be and usually is discharged from the freezing machine a much thinner or fluid state than when it is intended for immediate use; and it is therefore evident, that the continuous flow and circulation of a small portion of the cream from the upper portion of the freezing cylinder outward through the eduction port, and thence returning through the opening in the lower portion of the front head into the freezing cylinder permits the same to be inspected, and the exact condition of the cream within the freezing cylinder to be determined at all times, thus informing the operator by mere vision, as to the proper time for opening the outlet valve for ejecting the cream from the freezing cylinder according to the particular disposition to be made of the same.

I claim:

1. An ice cream freezer including a horizontal cylinder forming a freezing chamber with heads on its ends, refrigerating means around the cylinder and rotating scraping, agitating, and ejecting mechanism within the chamber, there being an opening in the lower portion of one head and an external hopper on the same head extending upward from and downward in front of the opening with a valved outlet mouth on its lower end, and there being an eduction port in the upper portion of the same head adapted to discharge into the hopper.

2. An ice cream freezer including a horizontal cylinder forming a freezing chamber with heads on its ends, refrigerating means around the cylinder and rotating scraping, agitating and ejecting mechanism within the chamber, there being an opening in the lower portion of one head and an external hopper on the same head extending upward from and downward in front of the opening with a valved outlet mouth on its lower end, and there being an eduction port in the upper portion of the same head with a downwardly directing spout leading therefrom into the hopper.

3. An ice cream freezer including a horizontal cylinder forming a freezing chamber with heads on its ends, refrigerating means around the cylinder and rotating scraping, agitating and ejecting mechanism within the chamber, there being an opening in the lower portion of one head and an external hopper on the same head extending upward from and downward in front of the opening with a valved outlet mouth on its lower end, and there being an eduction port in the upper portion of the same head adapted to discharge into the hopper, said port being located on the side of the median line of the head toward which the rotating mechanism operates.

4. A horizontal-cylinder ice-cream freezer head having an opening in its lower portion and an external hopper thereon extending upward from and downward in front of the opening with a valved outlet mouth in its lower end, there being a port in the upper portion of the head adapted to discharge into the hopper.

5. A horizontal-cylinder ice-cream freezer head having an opening in its lower portion and an external hopper thereon extending upward from and downward in front of the opening with a valved outlet mouth in its lower end, there being a port in the upper portion of the head with a downwardly directing spout leading therefrom into the hopper.

6. An ice-cream freezer having an opening in one end and an external hopper extending upward from the opening, and a port in the same end adapted to discharge cream into the hopper, with means for returning the discharged cream into the freezer.

7. An ice-cream freezer including a freezing chamber with a port in the wall thereof, and means for circulating a portion of the cream external to the chamber through the port and returning the same into the chamber during the freezing operation.

FRANK TYSON.

Witnesses:
HARRY FREASE,
CHAS. M. BALL.